(12) United States Patent
Berenger et al.

(10) Patent No.: US 8,548,099 B2
(45) Date of Patent: Oct. 1, 2013

(54) DEVICE FOR READING INFORMATION ON A DIGITAL BUS WITHOUT A WIRE CONNECTION TO THE NETWORK

(75) Inventors: Jean-Yves Berenger, Brison Saint Innocent (FR); Eric Medan, Annecy (FR)

(73) Assignee: Masternaut, Louviers (FR)

( * ) Notice: Subject to any disclaimer, the term of this patent is extended or adjusted under 35 U.S.C. 154(b) by 996 days.

(21) Appl. No.: 11/992,979

(22) PCT Filed: Oct. 5, 2006

(86) PCT No.: PCT/FR2006/002255
§ 371 (c)(1),
(2), (4) Date: Jun. 8, 2009

(87) PCT Pub. No.: WO2007/042651
PCT Pub. Date: Apr. 19, 2007

(65) Prior Publication Data
US 2009/0279645 A1    Nov. 12, 2009

(30) Foreign Application Priority Data

Oct. 6, 2005  (FR) ...................................... 05 10343
Jan. 12, 2006 (FR) ...................................... 06 00321

(51) Int. Cl.
*H04L 12/00* (2006.01)
*H04B 3/00* (2006.01)

(52) U.S. Cl.
USPC ............................................ 375/340; 375/257

(58) Field of Classification Search
USPC ................... 375/219–220, 257–258, 340, 346
See application file for complete search history.

(56) References Cited

U.S. PATENT DOCUMENTS

| | | | |
|---|---|---|---|
| 7,080,186 B2* | 7/2006 | Simon et al. | 710/305 |
| 7,467,309 B2* | 12/2008 | Templeton | 713/300 |
| 7,506,179 B2* | 3/2009 | Templeton | 713/300 |
| 2001/0006538 A1* | 7/2001 | Simon et al. | 375/259 |
| 2001/0053187 A1* | 12/2001 | Simon et al. | 375/257 |
| 2004/0236885 A1 | 11/2004 | Fredriksson et al. | 710/100 |
| 2005/0069277 A1* | 3/2005 | Nakazawa et al. | 385/147 |

* cited by examiner

Primary Examiner — Khanh C Tran
(74) Attorney, Agent, or Firm — Fay Sharpe LLP

(57) ABSTRACT

A device for reading information recovers signals exchanged on a digital data communications bus (4a, 4b) and processes these signals clips (5a, 5b) connect to multiplexed networks without a wire (galvanic) connection yet are configured for recovering the signals transmitted on the digital data communications bus.

11 Claims, 2 Drawing Sheets

DEVICE FOR READING INFORMATION ON A DIGITAL BUS WITHOUT A WIRE CONNECTION TO THE NETWORK

BACKGROUND

The present invention relates to a device for reading information carried on a data bus, and more particularly a device without a wired connection to the network. The invention is intended more particularly for the field of the onboard networks (automobile, transport, automation, aircraft . . . ). The invention can also be applied to other fields like data processing. The reading device of the invention permits recovery of the data of the network while preserving the integrity of wiring.

The object of the invention includes recovering the data exchanged on a digital communication bus. A communication bus is made of one or a plurality lines, each line can be configured as a metal conductor and its insulator.

The reading device, disposed on one or more of the lines, is free from a physical contact with the conducting part of the line. The invention is related more particularly to the multiplexed networks on paired wires of the copper type which equip all the new vehicles today, and in particular the network known by the name "CAN" (Controller Area Network) bus. The CAN, defined in various standards (ISO 11898-2, ISO11898-3, SAE J2411) according to the speed or the number of communication lines used, is the communications protocol by far more used today in the world manufacturers. But the invention could be generalized to other onboard networks (VAN, LIN, Flexray, AFDX . . . ), and with all the communication systems for digital network with physical support conductors permitting a coupling of the capacitive type.

The invention proposes a means of recovering the data circulating on a digital data bus (in fact the network CAN) of a vehicle without touching the physical integrity of the network.

Today, on the majority of the vehicles equipped with a CAN network, the manufacturers decline any responsibility if equipment of a "2nd party" including an intimate connection to their CAN bus is assembled on the vehicle. It is thus strongly advised making splices on the wiring harness of the vehicle.

Some connectable equipment for diagnostics is possibly tolerated by certain manufacturers. But this type of connection does not solve all of the problems. Certain CAN networks are not accessible for this capture and the obstruction of such a connection is not desirable in certain vehicles. The manufacturers refuse that other equipment is connected on their CAN bus, if they modify the topology and the electric characteristics of the network (problem of waking or nonwaking of the electronic assembly or parts of the of the modified vehicle for example).

Today, it there not of powerful solution making it possible to recover the CAN data on the vehicle without touching with the integrity of the network while guaranteeing a connection simple to carry out and stable in the time and with a correct cover rate (a number of messages received through device/a number of messages exchanged on the medium).

A solution exists today in Germany, to connect itself on the vehicle by preserving the integrity of the network. It uses the principle of the inductive coupling but present of this fact certain problems:

Obstruction of the clip which is a reel being able to be bulky for this type of applications the current version of the grip poses problems in time because it is not sufficiently fixed at the cable.

the principle of the inductive coupling is depend on the current fluctuations on the espionnée line. So that, according to the position of the grip on the network, a certain number of information can be mal-interprêtées the current version of the grip is not compatible with the whole speeds and technologies CAN now available. To cover the range of the configurations, one needs several of the same clips principle but for the different adjustments.

weak or poor Cover (a number of messages received through device/a number of messages exchanged on the medium).

SUMMARY

The present invention wants to solve the problems of the known systems, by proposing a device for reading information, including at least a connection clip, with capacitive coupling, which makes can be connected on the network without direct contact, while an electronic circuit, analyzes and processes the signals received after having amplified them and makes it possible to regenerate the data of the communication bus in the desired format. Using a capacitive type clip allows reducing the obstruction of the clip and facilitates its installation on the network.

covering the all speeds and CAN technologies used today with the same clip and the same electronics.

removing the potential problems related to the changes of the direction of current in a message according to the transmitter because the clip uses the principle of capacitive coupling working at various voltages.

One will also add that the clip of the device of the invention is put on two wire of the CAN network and thus carries out a differential measurement, which improves immunity from noise compared to a clip, which although functional would be connected on only one line of the communication bus.

Thus the device for reading information of the invention, is intended to recover the signals exchanged on a digital communication bus and to process these signals, and is characterized in that it includes means for connecting to multiplexed networks without a wire connection configured to recover the signals transmitted on the digital data bus.

According to a supplementary characteristic, the connection means include at least one connection clip without direct electrical contact, which is a capacitive type clip.

According to another characteristic clip includes a first peripheral metal envelope around which is disposed an insulating layer such as for example made out of an elastomer or the like, around which a surrounding wire ensuring physical coupling thanks to means for tightening such as a screw or any other means.

Let us add that where the clip is connected with an electronic circuit, which analyzes and processes the received signals, and that the clip is put on at least one line of the communication bus, or two lines of the communication bus to carry out a differential measurement.

According to the embodiment given by way of example, the electronic processing circuit includes at least an amplifier configured to amplify the rising and descending pulse signals, a detector and a comparator, a circuit for re-arranging of the processed signals, an output driver.

note also that the device of the invention is completely adapted for the reading of CAN data.

Thus, the device of the invention allowing without direct contact,
- connection on the CAN network of a vehicle for reading the data circulating on it without affecting the physical integrity of the CAN network, (no wire is cut and no modifications to the electric characteristics or protocol) and of
- facilitated connection in the vehicle, at a place in the vehicle where the network is available and accessible all while not being awkward for the operation of the vehicle.
- without disturbing the digital data bus in the event of failure.

Of other characteristics and advantages of the invention will become apparent from the description which will follow accompanied by the attached drawings which are given only by way of nonrestrictive examples.

DETAILED DESCRIPTION

Figure 1:
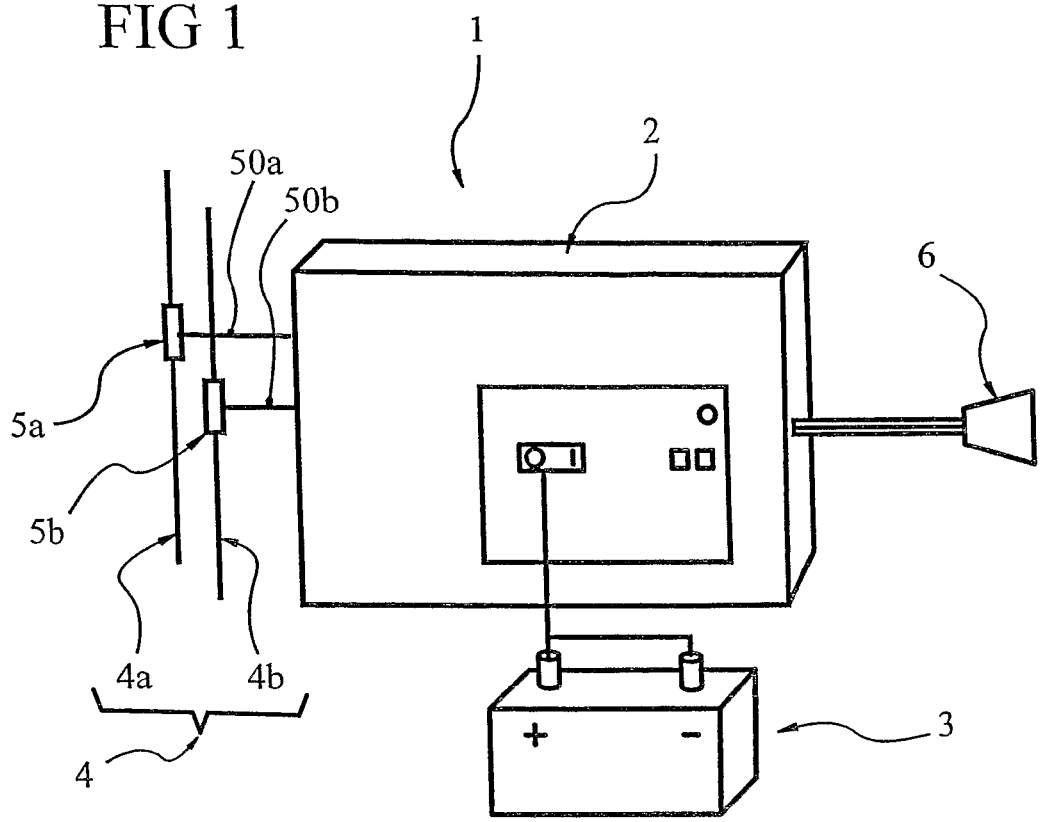
FIG. 1 is an overall diagrammatic view of the device.

The device carrying the general reference (1) includes a processor case (2) connected to a power supply such as the battery (3) for example that of the vehicle equipped with the device, while the aforementioned case is connected on the electrical supply network CAN (4) of the vehicle.

According to the preferred embodiment of the invention, the device includes two connection clips (5a, 5b), namely and for example, the first connection (5a) installed on the line CAN H (4a) of rising pulse signal, and the second connection (5b) installed on the line CAN L (4b) of descending pulse signal.

Connections (5a, 5b) are made by clips without contact thus without wire connection, intended to recover the signals exchanged on the digital data bus.

The clips are clips ensuring a coupling of the capacitive type, which allows:
- to reduce the cumbersomeness of the clip and to thus facilitate its installation in a vehicle.
- to cover the range of speeds and the CAN technologies now used with the same clip and electronics.
- to surpress the potential problems related to the current fluctuations because the grip uses the principle of the capacitive coupling working with variations of voltage and there are no similar problems known to date.

The two clips (5a, 5b) are installed on two wires of the CAN network (4a, 4b), the line CAN H (4a) with the rising pulse signal and the line CAN L (4b) with the descending pulse signal and carries out a differential measurement, which improves immunity to the noise as compared to a version with only one clip connected with only one line.

Figure 2:
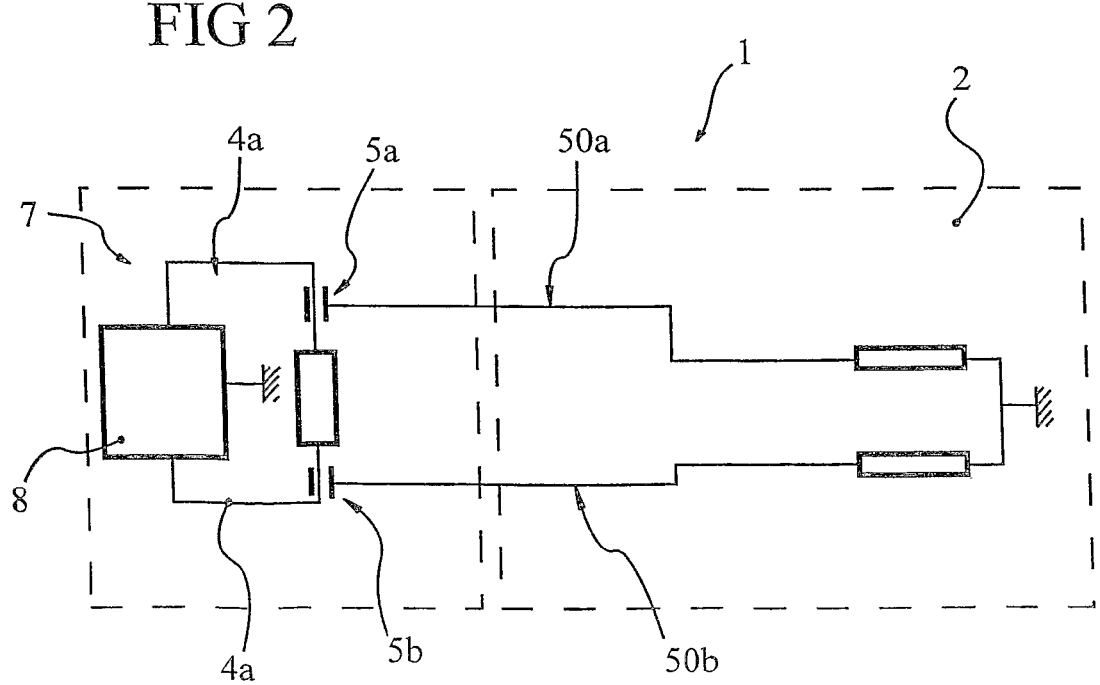
FIG. 2 is a view representing a circuit diagram for the connection clip of the device.

FIG. 2 is a view representing in a diagrammatic way the connection clips (5a, 5b) of the inventive device (1). By virtue of this figure, one will note that the connection clip is divided into two parts, namely a part for the CAN line, the CAN network including two lines, namely a first line (4a) corresponding to the level of CAN H of the rising pulse signal, and a second line (4b) corresponding to the level CAN L of the descending pulse signal, the network in place (7) including obviously at least a source of signal (8), such as for example the ABS system, the airbags, the brake lights and others. The clips (5a, 5b) are connected thanks to wire of connection (50a, 50b) to electronics (2), which allows delivery of the information collected by the clips.

Of course one could design only one clip (5) which would be connected to the two communication lines (4a, 4b), to use only one line for applications requiring less precision or being on buses of a communication line.

Let us add that the case (2) includes additional connection means (6) allowing its connection to a computer.

Figure 3:
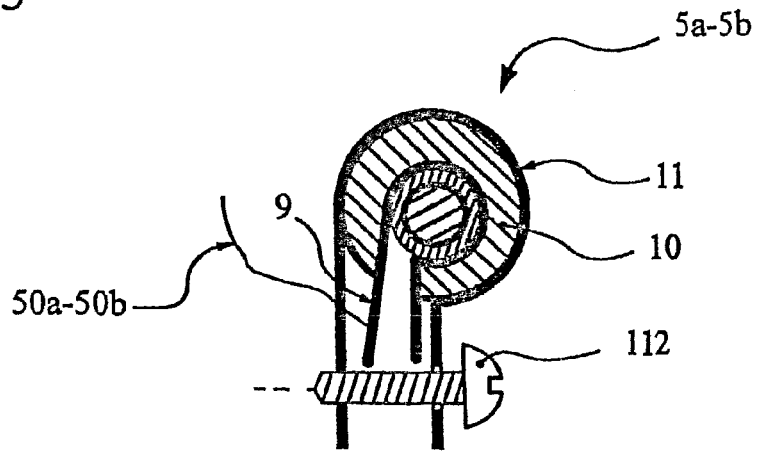
FIG. 3 is a diagrammatic view in transverse section of the connection clip, assembled on the line of a corresponding bus.

FIG. 3 is a diagrammatic view in transverse section of the connection clip, installed on the line of the corresponding bus. The clip is illustrated in a diagrammatic way in an inactive position before its locking on the line. The line of the CAN bus is in the center and the clip which surrounds it includes a first metal peripheral wrap (9) around which is disposed a flexible insulating layer (10) such as for example made out of an elastomer or the like, around which is disposed a squeeze wire (11) ensuring the physical coupling thanks to means of tightening (112) such as a screw or any other means. Of course the connection clip based on the same principle could be of any other kind and have the form of a true clip with jaws urged closed by an elastic system.

Figure 4:
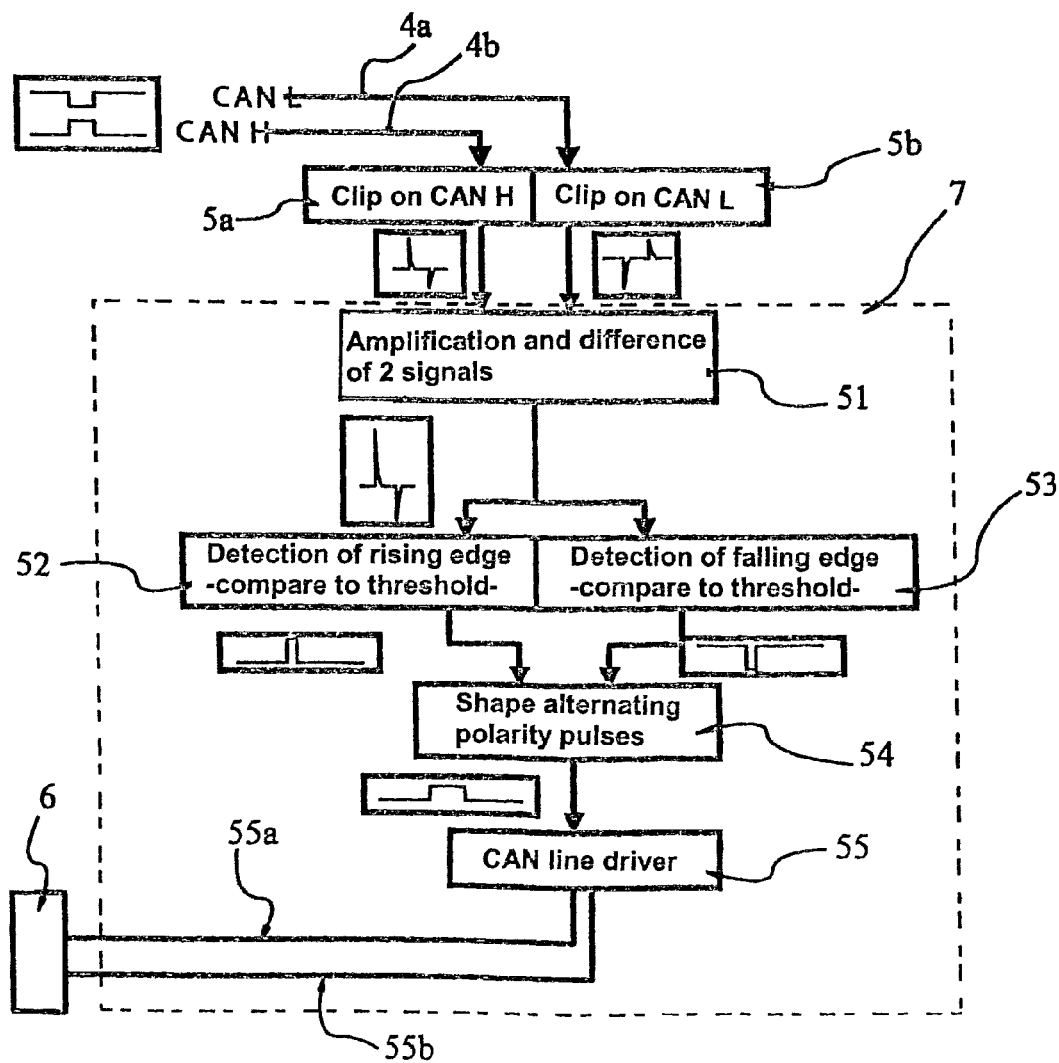
FIG. 4 is a view illustrating in a schematic way the processing circuit of the signal.

FIG. 4 is a view illustrating in a diagrammatic way the circuit for processing the signal.

Thus the rising pulse signals and the descending pulse signals from the clips (5a, 5b) are sent in an electronic module (2) there to be amplified and compared in an amplification module (51). Indeed the rising pulse signals as well descending pulse being of too low amplitude could not be processed correctly, and this is why it is rendered necessary to amplify them. Then one carries out detection of the rising edge and falling edge and with their comparison with a threshold, then the signals thus generated are transmitted in a shaping circuit (54) to be transmitted by a driver (55) of CAN line, whose outputs (55a, 55b) are connected to a connector for example one of series type (6) allowing for the connection of the module (2) with a computer.

According to the embodiment illustrated by way of example, amplification is performed in the processing circuit, but it could be otherwise such as for example at the clip, or other suitable places.

It was understood from the preceding that the device of the invention allows tapping a CAN network without modifying the topology and the electric characteristics of the network. Thus, the access to CAN information of the vehicle can be opened to external companies (which is in connection with the regulation).

One will also note that the connection of the device is particularly simple, because its connection clip can be connected easily in a regarded vehicle thanks to its compactness and that it there no direct connection with the network. In addition the aforementioned connection clip can be placed at any place on the topology of the network. Moreover the aforementioned clip is universal and can thus be used for all types of CAN networks today in a vehicle (today 2 types of physical layers CAN HS or CAN LS with different speeds from 75 Kbits/s to 1 Mbits/s).

It follows from this that the device of the invention could just as easily be used for the reading computer information, for supervising for example commutations on an agent of a vehicle.

Of course, the invention is not limited to the embodiments described and illustrated by way of examples, but it includes also all the technical equivalents as well as their combinations.

The invention claimed is:

1. A device for reading data intended to recover signals exchanged on a digital data bus and to process the signals, including:
    at least one connection capacitive type clip for connecting to multiplexed networks without a wire connection and configured for recovering signals transmitted on the digital data bus, the clip including:
        a first metal peripheral envelope around which is disposed an insulating layer, around which is disposed an encircling tightening wire which ensures physical coupling thanks to a means for tightening.

2. The device for reading data according to claim 1, wherein the clip is connected to an electronic circuit, which analyzes and processes the recovered signals.

3. The device for reading data according to claim 1, wherein the clip is attached to at least one line of the digital data bus.

4. The device for reading data according to claim 3, wherein the clip is attached to two lines of the digital data bus and performs a differential measurement.

5. A device for reading data intended to recover signals exchanged on a digital data bus and to process the signals, including:
    a clip for connecting to multiplexed networks without a wire connection configured for recovering signals transmitted on the digital data bus; and,
    an electronic processing circuit which includes at least:
    one amplifier configured to amplify rising and descending pulse signals,
    a detector and a comparator,
    a circuit for shaping the pulse signals,
    an output driver.

6. The device for reading data according to claim 5, installed to read data from a CAN (Controller Area Network) network.

7. The device for reading data intended to recover signals exchanged on a digital data bus and to process the signals including at least one clip for connecting to multiplexed networks without a wire connection configured for recovering signals transmitted on the digital bus, the at least one clip comprising:
    a peripheral metal layer which is disposed around an insulating jacket of the digital data bus without penetrating the jacket;
    an insulating layer around the peripheral metal layer.

8. A device for reading data intended to recover signals exchanged on a digital data bus and to process the signals, including:
    at least one connection capacitive type clip for connecting to multiplexed networks without a wire connection and configured for recovering signals transmitted on the digital data bus, the clip comprising:
        a generally U-shaped electrical contact which is configured to be disposed at least partially around an insulating jacket of a first line of the digital data bus;
        an insulating portion disposed around the generally U-shaped electrical contact; and
        a clamp element disposed around the insulating portion to press the insulating portion against the generally U-shaped electrical contact to press the generally U-shaped electrical contact against the insulating jacket of the data bus.

9. The device for reading data according to claim 8, further including a second clip comprising:
    a generally U-shaped electrical contact which is configured to be disposed at least partially around an insulating jacket of a second line of the digital data bus;
    an insulating portion disposed around the generally U-shaped electrical contact; and
    a clamp element disposed around the insulating portion to press the insulating portion against the generally U-shaped electrical contact to press the generally U-shaped electrical contact against the insulating jacket of the digital data bus.

10. The device for reading data according to claim 9, further including:
    a circuit for differentially combining pulse signals received by the first and second clips.

11. The device for reading data according to claim 9, further including:
    an amplifier that amplified pulses received by the first and second clips;
    one or more circuits which detect using leading edges of the pulses received by the first clip with a threshold and compare an amplitude of the rising leading edges with a first threshold and which detect falling leading edges of the pulses received by the second clip and compare the falling leading edges with a second threshold;
    a circuit for combining and shaping the pulses with the rising and falling leading edges; and
    an output driver which outputs the combined and shaped pulses to a connector configured for connection to a computer.

* * * * *

UNITED STATES PATENT AND TRADEMARK OFFICE
CERTIFICATE OF CORRECTION

PATENT NO. : 8,548,099 B2
APPLICATION NO. : 11/992979
DATED : October 1, 2013
INVENTOR(S) : Berenger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Fifteenth Day of September, 2015

Michelle K. Lee
*Director of the United States Patent and Trademark Office*